United States Patent
Sugino et al.

(10) Patent No.: US 9,829,127 B2
(45) Date of Patent: Nov. 28, 2017

(54) THREADED JOINT FOR STEEL PIPES

(75) Inventors: Masaaki Sugino, Nishinomiya (JP);
 Shigeo Nagasaku, Nishinomiya (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 827 days.

(21) Appl. No.: 13/423,811

(22) Filed: Mar. 19, 2012

(65) Prior Publication Data
US 2012/0235406 A1 Sep. 20, 2012

Related U.S. Application Data

(63) Continuation of application No. PCT/JP2010/066132, filed on Sep. 17, 2010.

(30) Foreign Application Priority Data

Sep. 29, 2009 (JP) .................................. 2009-224762

(51) Int. Cl.
 *F16L 15/00* (2006.01)
 *E21B 17/042* (2006.01)

(52) U.S. Cl.
 CPC .......... *F16L 15/001* (2013.01); *E21B 17/042* (2013.01)

(58) Field of Classification Search
 USPC .......................... 285/333–334, 355, 383, 390
 See application file for complete search history.

(56) References Cited

U.S. PATENT DOCUMENTS

| 4,067,596 | A | * | 1/1978 | Kellner et al. | ............. 285/123.3 |
| 4,846,508 | A | * | 7/1989 | Pallini et al. | ............. 285/148.19 |
| 4,865,364 | A | * | 9/1989 | Nobileau | ........................ 285/334 |
| 5,037,318 | A | * | 8/1991 | Robertson | ........................ 439/98 |
| 6,447,025 | B1 | | 9/2002 | Smith | |
| 6,752,436 | B1 | * | 6/2004 | Verdillon | ........................ 285/333 |
| 7,585,002 | B2 | * | 9/2009 | Curley et al. | ................. 285/333 |
| 2002/0033603 | A1 | * | 3/2002 | Pallini et al. | ................. 285/333 |
| 2005/0236834 | A1 | * | 10/2005 | Curley et al. | ................. 285/333 |

FOREIGN PATENT DOCUMENTS

| JP | 58-110793 | 7/1983 |
| JP | 09-273671 | 10/1997 |
| JP | 11-294650 | 10/1999 |
| JP | 2001-056075 | 2/2001 |

* cited by examiner

*Primary Examiner* — Aaron Dunwoody
*Assistant Examiner* — Fannie Kee
(74) *Attorney, Agent, or Firm* — Clark & Brody

(57) ABSTRACT

The galling resistance of a threaded joint for steel pipes which has a pin with triangular male threads and a box with triangular female threads which threadingly engage with the male threads and an unthreaded sleeve positioned at the end of the box is improved. The unthreaded sleeve is shortened or removed so that the length of the unthreaded sleeve in the axial direction of the box becomes at most ½ (including 0). The shape of the box may be modified by providing a swoosh portion at the end of the box and/or by making the bevel angle at the end of the female threads ±15 degrees of the flank angle of the female threads.

5 Claims, 3 Drawing Sheets

PRIOR ART

THREADED JOINT FOR STEEL PIPES

TECHNICAL FIELD

This invention relates to threaded joints for steel pipes used for connecting steel pipes (typified by oil country tubular goods) used for the excavation and production of gaseous or liquid underground resources such as crude oil, natural gas, methane hydrates, underground water, hot springs, and the like to each other. More specifically, the present invention relates to a modification of a round threaded joint prescribed by the standards of the American Petroleum Institute (API).

BACKGROUND ART

Steel pipes such as oil country tubular goods used for the excavation of underground resources are normally connected with each other by threaded joints. A threaded joint for steel pipes generally has a pin-box structure comprising a pin having male (external) threads and a box having female (internal) threads which threadingly engage with the male threads. Typically, a pin is formed on the outer surface of both ends of a steel pipe, and a box is formed on the inner surface of a separate connecting member referred to as a coupling. This type of threaded joint is referred to as a coupling-type threaded joint. There are also integral threaded joints in which a pin is provided on the outer surface of one end of a steel pipe and a box is provided on the inner surface of the other end of the pipe, and steel pipes are directly connected to each other without using a coupling. The threads formed on the pin and the box of a threaded joint are typically selected from trapezoidal threads (buttress threads), triangular threads (round threads), hook threads, and the like.

One type of threaded joint for steel pipes is a so-called API joint, which is a threaded joint which has been standardized by the American Petroleum Institute. FIG. 4 is a cross-sectional view showing the longitudinal cross-sectional shape of a coupling-type API round threaded joint.

A coupling-type round threaded joint 1 shown in FIG. 4 comprises pins which are formed on the outer surfaces of the ends of steel pipes 2 and 3 and boxes which are formed on the inner surface of a short connecting member (a coupling) 4. The pins are formed by providing tapered male threads 2a and 3a in the shape of round threads having a generally triangular cross-sectional shape in the axial direction of the pipe on the outer surfaces of the ends of the steel pipes 2 and 3. The boxes which oppose the pins are formed by providing tapered female threads 4a in the shape of round threads which threadingly engage with the male threads 2a and 3a of the pins on the inner surfaces of the coupling 4 at both ends thereof. In addition to the female threads 4a, each box has an unthreaded sleeve 4b having an inner diameter which is larger than the outer diameter of the pipes 2, 3 at both lengthwise ends of the coupling 4. The unthreaded sleeve 4b serves as an insert guide.

Makeup (tightening) of a threaded joint is carried out by mechanical tightening using a tightening mechanism which is referred to as power tongs and which is operated by oil pressure or water pressure. Makeup is completed when a prescribed torque reaction force is reached or when a predetermined makeup position is reached. When makeup of a pin and a box is completed, the threads of the pin and box are in the state of interference fitting in which the threads are tightened beyond the position in which they are just contacting, so an extremely strong connection is achieved.

Galling of the threads of a threaded joint develops due to slight problems at the time of makeup such as misalignment of the axes of the male threads and the female threads, the presence of sand or rocks on the threads, or an insufficient amount of lubricant. Normally, a tightening mechanism for threaded joints, lubricant for the threads, and the tightening procedure in the field are controlled so that galling does not take place. However, it is sometimes not possible to adequately carry out such control at oil wells in severe environments which have become increasingly common in recent years. Therefore, the problem of galling often takes place.

There have been many proposals which attempt to prevent galling (or improve galling resistance) by improving a lubricant which is applied to the surface of a threaded joint, by improving a lubricating coating which is sometimes framed on the surface, or by improving a method for surface treatment performed on the surface (such as surface roughening treatment). It has also been proposed to prevent galling by modifying the thread shape.

Threaded joints for steel pipes in which prevention of galling is achieved by improving a lubricating coating or surface treatment often require care in handling so as not to damage the lubricating coating or surface treatment. During transport of pipes to an oil well or due to rough handling in the field or careless control during storage, defects such as peeling of the lubricating coating can easily take place. If such defects occur, it is not possible to improve galling resistance.

Concerning improvements in thread shape, U.S. Pat. No. 6,447,025 discloses a threaded joint for steel pipes in which the rounding of the crests of the male threads of a pin with round threads is made larger on the stabbing flank side than on the load flank side. As a result, scratches and abrasions at the time of thread makeup can be prevented. However, although such a thread shape can prevent damage to the flanks of the opposing threads of the pin and the box at the start of makeup, it cannot prevent galling caused by a local high contact state as discussed below.

In the threaded joint for steel pipes disclosed in JP 2001-56075 A, the pitch of the male threads of a pin is made 1-7 micrometers smaller than the pitch of the female threads of a box. As a result, an increase in the contact force on the thread flanks caused by elongation of the pin in the axial direction due to the Poisson effect in the state of interference fitting is suppressed and galling resistance is increased. Namely, this threaded joint for steel pipes can exhibit the effect of increasing galling resistance in a state in which the threads of the pin and the box are adequately tightened to achieve interference fitting so that the pin has elongated in the axial direction due to the Poisson effect. However, in the initial stage of makeup in which the threads of the pin and the box are not yet interfering, due to the difference of the thread pitch between the pin and box, an unnecessary contact force develops on the thread flanks, and galling can easily develop.

SUMMARY OF THE INVENTION

The object of the present invention is to provide a threaded joint for steel pipes which has round threads as prescribed by API (namely, threads having a generally triangular cross-sectional shape in the axial direction of the joint, referred to herein as triangular threads) and which can stably exhibit galling resistance without resorting to improvements in a lubricating coating or surface treatment and without changing the thread shape or thread pitch.

The present inventors performed detailed investigations of the state of occurrence of galling in a coupling-type API round threaded joint which occurs during makeup in the field. It was found that galling develops on the male threads from its central portion in the axial direction of a pin formed on the outer surface on the end of a steel pipe towards the body of the steel pipe, while on the female threads of a box formed on the inner surface of a coupling, galling occurs from the end of the coupling towards the vicinity of the central portion in the axial direction of the female threads. Namely, galling does not take place from the central portion of the male threads towards the end of the steel pipe or from the central portion of the female threads towards the rear of the coupling.

Galling develops when the contact pressure between threads locally become extremely high. The present inventors performed detailed investigation by numerical simulation using an analysis by the finite element method of where a high contact pressure occurs on a threaded joint. They found that the contact pressure of the threads located at the ends of a coupling is from several times to several tens of times higher than the contact pressure of the threads located in other portions. Namely, they found that the main cause of the occurrence of galling is that the threads at the ends of a coupling undergo contact with a locally high contact pressure (referred to below for short as a "high contact state").

The present inventors thought that galling could be eliminated if a high contact state of the threads at an end of a coupling (namely, the opening end of a box, which is an opening which receives a pin) could be alleviated. As a result of further investigation of the main causes of a high contact state of the threads at the ends of a coupling, the below-described two main causes (a) and (b) were discovered.

(a) The average level of the contact pressure applied to threads is determined by the interference force, namely, the pressing force between the female threads and the male threads which develops due to forcefully screwing male threads with a large diameter into female threads with a small diameter. In other words, the contact pressure of threads can be said to develop due to the elastic restoring force which acts so as to cause the female threads which are expanded in diameter by the male threads to contract to their original diameter and the elastic restoring force which acts so as to cause the male threads which were reduced in diameter by the female threads to expand to their original diameter.

In the threads in the vicinity of the center in the axial direction of a coupling, the elastic restoring force is distributed among a number of adjoining threads. Therefore, the load per thread is reduced, and an excessive increase in the contact force of the threads is prevented. In contrast, the threads in the vicinity of the ends of a coupling are also subjected to the elastic restoring force which causes to contract the unthreaded sleeves at the ends of the coupling to their original diameter. Therefore, the contact force excessively increases in the threads in the vicinity of the ends of a coupling more than in the threads in the vicinity of the central portion in the axial direction of the coupling.

(b) The threads close to each end of a coupling are incomplete threads having an incomplete thread shape in which a portion of the threads is cut off by beveling at the end of the female threads. Due to partial contact of a corner of the incomplete thread, the contact force applied to a few female threads at the ends of the coupling locally undergoes an excessive increase.

The present inventors thought that galling resistance could be greatly increased if one or both of these two main causes could be eliminated or alleviated. As a result of further investigation, they found that the following measures (i)-(iii) are effective at decreasing the local contact pressure applied to the threads at the ends of a coupling in an API round threaded joint.

(i) removing or shortening the unthreaded sleeves which are provided at the ends of a coupling, (ii) excising the outer surface of the ends of a coupling for a certain axial length to decrease its wall thickness (a portion which has its wall thickness decreased in this manner is referred to herein as a swoosh portion), (iii) particularly in the case of round threads, in order to decrease partial contact by the incomplete threads in the ends of a coupling, by setting the bevel angle at the ends of the female threads to approximately the same value as the flank angle of the round threads, the number of incomplete threads which undergo partial contact can be minimized.

The present invention is a threaded joint for steel pipes which has a shape which satisfies the standards for a round thread joint specified by the American Petroleum Institute (API) and which is constituted by a pin and a box which interfit, the pin having male threads with a triangular shape, and the box having female threads with a triangular shape which mesh with the male threads, an unthreaded sleeve at the ends of the box, and a beveled portion having a sloping surface which connects the unthreaded sleeve or the end surface of the box to the endmost thread disposed closest to the end surface of the box, the length of the unthreaded sleeve in the axial direction of the box is at most ½ (including zero) of the value prescribed by the above standards, and the box has a swoosh portion in a portion of the box which extends rearwards from its end surface by at least two threads from the female thread closest to the end surface of the box and which has an outer surface with a radius which is smaller than the radius of the outer surface of the box in the normal portion other than the above-described portion of the box by at least ⅓ and at most ½ of the difference between the radius of the outer surface and the inner radius of the inner surface of the end surface of the box.

The unthreaded sleeve is a portion having a substantially constant inner diameter (namely, its inner surface is substantially cylindrical) disposed at the opening end of a box of an API round threaded joint (a round threaded joint prescribed by the American Petroleum Institute). The substantially cylindrical inner surface may have a minute angle of slope of at most ∀5 degrees.

The length of the unthreaded sleeve in the axial direction of the box may be 0, with 0 being a preferred length. Namely, the box preferably has no unthreaded sleeve by removing the entire length of this sleeve.

Preferably, the portion of the box extending rearwardly in the axial direction from its end surface to a location at least two threads from the end of the female threads closest to the box end surface (this portion is referred to as the box end portion) forms a thin-walled portion (referred to herein as a swoosh portion) in which the outer peripheral surface of the box is excised by a thickness of at least ⅓ and at most ½ of the wall thickness of the unthreaded sleeve prescribed in API.

As stated above, the unthreaded sleeve may be completely removed in a threaded joint for steel pipes according to the present invention. Even in this case, the thickness by which the outer peripheral surface of the box is excised in order to form a swoosh portion is determined as above based on the wall thickness of the unthreaded sleeve before removal of the unthreaded sleeve which is prescribed by API standards.

The outer surface of the swoosh portion can be a cylindrical surface, a tapered surface, or a surface of revolution formed by rotating a simple geometric curve such as an arc of circle, a parabola, a hyperbola, or the like. It may also be a surface obtained by combining two or more surfaces having different shapes. When the outer surface is not a cylindrical surface, the wall thickness of the swoosh portion is the average value of the wall thickness over the whole length of the swoosh portion.

The bevel angle at the end of the female threads closest to the end of the box (the thread end bevel angle) is preferably in the range of ∀15 degrees of the flank angle of the triangular threads (30 degrees according to the above standards).

A threaded joint for steel pipes according to the present invention can stably exhibit excellent galling resistance with a usual lubricant or with usual surface treatment even when it is in the field at an oil well where there is poor quality control and poor process control and it undergoes rough handling.

EMBODIMENTS OF THE INVENTION

Below, embodiments of the present invention will be explained while referring to the accompanying drawings.

Figure 1:
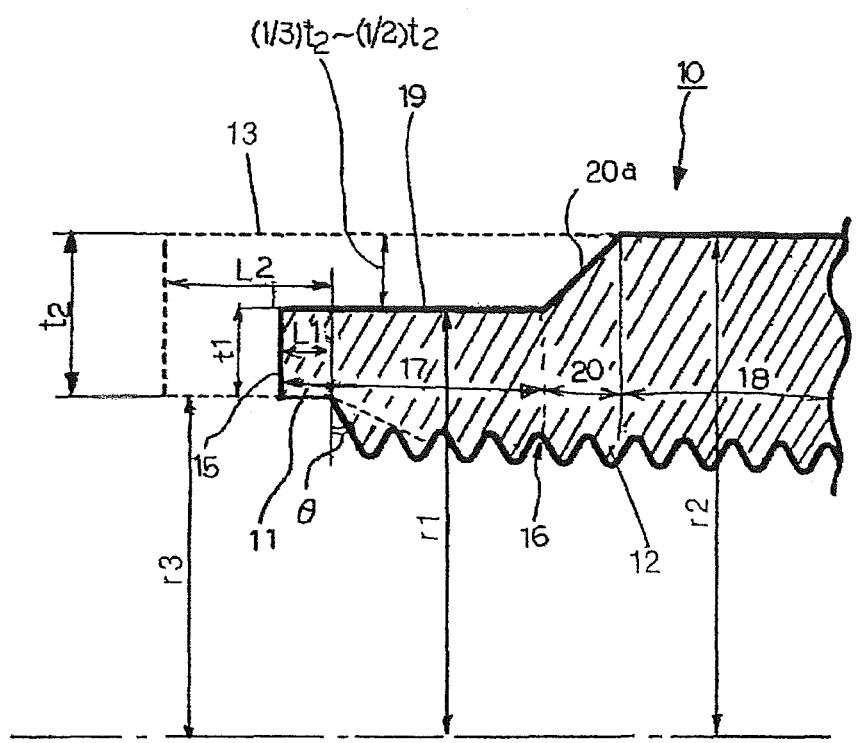
FIG. 1 is a cross-sectional view of a portion of the end of a box of a threaded joint for steel pipes according to the present invention.
Figure 4:
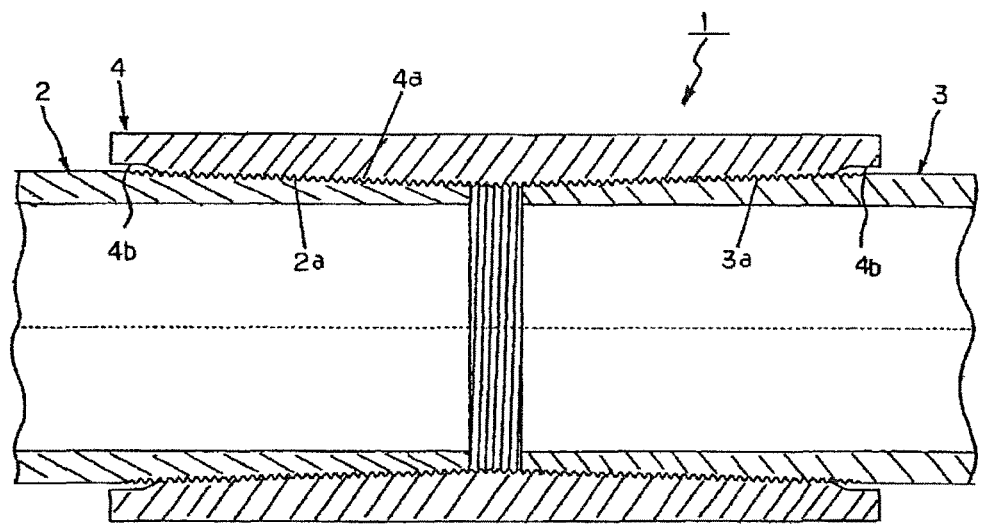
FIG. 4 is a cross-sectional view showing the longitudinal cross-sectional shape of a coupling-type API round threaded joint.

FIG. 1 is a cross-sectional view of a portion of the end of a box 10 of a threaded joint for steel pipes according to the present invention. The present invention can be applied not only to a coupling-type threaded joint but also to an integral-type threaded joint for steel pipes. Accordingly, a box having female threads can be formed at both ends of a coupling as shown in FIG. 4, or it can be formed on one end of a steel pipe. Below, the present invention will be explained primarily using a coupling-type threaded joint, namely, an embodiment in which a box is formed on a coupling as an example.

A threaded joint for steel pipes is constituted by a pin and a box which can fit each other. In the case of a coupling-type threaded joint for steel pipes, a pin is foamed on both ends of a steel pipe. Since the present invention is directed to a threaded joint which satisfies the standards for a round threaded joint prescribed by the API (except for the modifications described below), the pin has male threads with a triangular thread shape formed on the outer surface of the ends of a steel pipe.

As shown in FIG. 1, the box 10 has an unthreaded sleeve 11 provided at the opening end of the box (the portion with an opening for insertion of a pin) and female threads 12 which are provided on the inner portion of the box next to the unthreaded sleeve 11 and which threadingly engage with male threads of an unillustrated pin. In the case of a coupling-type threaded joint, as shown in FIG. 4, a box is formed on both sides of a short tube (a coupling). Accordingly, the coupling has an unthreaded sleeve 11 at both ends thereof and having female threads 12 disposed closer to the lengthwise center of the coupling than the unthreaded sleeves 11.

The dashed line in FIG. 1 indicates the shape of the vicinity 13 of the opening end of the box 10 of an API round threaded joint. Namely, a box of an API round threaded joint has an unthreaded sleeve having a length L2 in the axial direction of the box. L2 is the standard value of the length in the axial direction of the unthreaded sleeve of an API round threaded joint.

The inner diameter of the unthreaded sleeve 11 of the box 10 is larger than the outer diameter of the body of a steel pipe which is connected by the threaded joint. The inner diameter of the unthreaded sleeve is prescribed by API standards. The female threads and the unthreaded sleeve of the box are usually connected by a sloping surface (a tapered surface). The angle θ of the sloping surface is referred is to as the bevel angle. A sloping surface conforming with API standards is shown by the dashed line in FIG. 1.

According to the present invention, the length L1 in the axial direction of the box 10 of the unthreaded sleeve 11 which is disposed at the opening end of the box 10 is at most ½ of the standard value L2 of the length in the axial direction of the unthreaded sleeve of an API round threaded joint, and it may be 0. Namely, the length L1 satisfies the relationship 0≤L1≤(½)L2.

Thus, the unthreaded sleeve 11 may be completely omitted, and the absence of an unthreaded sleeve is preferable from the standpoint of obtaining the maximum effect of decreasing the contact pressure applied to the threads. However, when it is difficult to completely remove the unthreaded sleeve due to manufacturing convenience or the like, the unthreaded sleeve 11 may be retained so long as its length is at most ½ the standard value L2 specified by API.

In the present invention, an API round threaded joint means a round threaded joint selected from round threaded joints specified by API specification 5CT or API standard 5B and more specifically selected from a casing short-threaded joint (abbreviated below as STC), a casing long-threaded joint (abbreviated below as LTC), a non-upset tubing threaded joint (abbreviated below as NUE), an external-upset tubing threaded joint (abbreviated below as EUE), and in integral-tubing threaded joint (abbreviated below as IJC). Of these, an IJC is an integral-type round threaded joint, so it does not have a coupling. The remainder are coupling-type joints.

The standard value L2 of the length in the axial direction of the unthreaded sleeve in an API round threaded joint is listed below for each type of threaded joint:

(STC)

L2=0.5 inches when the nominal outer diameter of the body of an oil country tubular good (abbreviated as the pipe OD) is 4½ to 7 inches, L2=0.433 inches when the pipe OD is 7⅝ to 13⅜ inches, and L2=0.366 inches when the pipe OD is 16 to 20 inches.

(LTC)

L2=0.5 inches when the pipe OD is 4½ to 7 inches, L2=0.433 inches when the pipe OD is 7⅝ to 9⅝ inches, and L2=0.366 inches when the pipe OD is 20 inches.

(NUE)

L2=5/16 inches when the pipe OD is 1.05 to 3½ inches, and L2=⅜ inches when the pipe OD is 4 to 4½ inches.

(EUE)

L2=5/16 inches when the pipe OD is 1.05 to 1.9 inches, and L2=⅜ inches when the pipe OD is 2⅜ to 4½ inches.

(IJC)

L2=5/32 inches when the pipe OD is 1.315 inches, and L2=5/16 inches when the pipe OD is 1.66 to 2.063 inches.

The overall dimensions and shape of the box 10 other than the length L1 in the axial direction of the unthreaded sleeve 11 satisfy the standard values for an API round threaded joint. However, as stated below, it is possible to add improvements at the end of the box (namely, variations from API standards) by provision of a swoosh portion or by varying the bevel angle. The thread shape and thread pitch of each of the pin and the box are the same as prescribed by API standards with no need of modifications.

In addition to the length L2 in the axial direction of the unthreaded sleeve, the dimensions specified by API standards for the end of the box include the outer diameter W (two times the radius r2 in FIG. 1) of the box (of the coupling in the case of a coupling-type joint), the inner diameter Q of the unthreaded sleeve (two times radius r3 in FIG. 1), and the bevel angle θ at the end of the female threads.

Of these standard values, the bevel angle θ at the end of the female threads is 65 degrees for each of a STC, LTC, NUE, EUE, and IJC. Tables 1-4 give specific values for the outer diameter W of the coupling and the inner diameter Q of the unthreaded sleeve for each type of joint. (W−Q)/2 of course corresponds to the wall thickness t2 of the unthreaded sleeve.

All of the above-mentioned API standard values are nominal values, and the tolerances thereof are the tolerances specified by API specification 5CT or API standard 5B.

TABLE 1

Standard values for each portion of unthreaded sleeve of coupling of STC and LTC

| Nominal OD of OCTG body | OD of coupling W | ID of unthreaded sleeve Q | Wall thickness of unthreaded sleeve t2 |
|---|---|---|---|
| 4½" | 5.000" | 4¹⁹/₃₂" | 0.203" |
| 5" | 5.563" | 5³/₃₂" | 0.235" |
| 5½" | 6.050" | 5¹⁹/₃₂" | 0.228" |
| 6⅝" | 7.390" | 6²³/₃₂" | 0.336" |
| 7" | 7.656" | 7³/₃₂" | 0.281" |
| 7⅝" | 8.500" | 7²³/₃₂" | 0.391" |
| 8⅝" | 9.625" | 8²³/₃₂" | 0.453" |
| 9⅝" | 10.625" | 9²³/₃₂" | 0.453" |
| 10¾" | 11.750" | 10²⁷/₃₂" | 0.453" |
| 11¾" | 12.750" | 11²⁷/₃₂" | 0.453" |
| 13⅜" | 14.375" | 13¹⁵/₃₂" | 0.453" |
| 16" | 17.000" | 16³/₃₂" | 0.453" |
| 18⅝" | 20.000" | 18²³/₃₂" | 0.641" |
| 20" | 21.000" | 20³/₃₂" | 0.453" |

TABLE 2

Standard values for each portion of unthreaded sleeve of coupling of NUE

| Nominal OD of OCTG body | OD of coupling W | ID of unthreaded sleeve Q | Wall thickness of unthreaded sleeve t2 |
|---|---|---|---|
| 1.050" | 1.313" | 1.113" | 0.1" |
| 1.315" | 1.660" | 1.378" | 0.141" |
| 1.660" | 2.054" | 1.723" | 0.166" |
| 1.900" | 2.200" | 1.963" | 0.119" |
| 2⅜" | 2.875" | 2.438" | 0.219" |
| 2⅞" | 3.500" | 2.938" | 0.281" |

TABLE 2-continued

Standard values for each portion of unthreaded sleeve of coupling of NUE

| Nominal OD of OCTG body | OD of coupling W | ID of unthreaded sleeve Q | Wall thickness of unthreaded sleeve t2 |
|---|---|---|---|
| 3½" | 4.250" | 3.563" | 0.344" |
| 4" | 4.750" | 4.063" | 0.344" |
| 4½" | 5.200" | 4.563" | 0.319" |

TABLE 3

Standard values for each portion of unthreaded sleeve of coupling of EUE

| Nominal OD of OCTG body | OD of coupling W | ID of unthreaded sleeve Q | Wall thickness of unthreaded sleeve t2 |
|---|---|---|---|
| 1.050" | 1.660" | 1.378" | 0.141" |
| 1.315" | 1.900" | 1.531" | 0.185" |
| 1.660" | 2.200" | 1.875" | 0.163" |
| 1.900" | 2.500" | 2.156" | 0.172" |
| 2⅜" | 3.063" | 2.656" | 0.204" |
| 2⅞" | 3.668" | 3.156" | 0.256" |
| 3½" | 4.500" | 3.813" | 0.344" |
| 4" | 5.000" | 4.313" | 0.344" |
| 4½" | 5.563" | 4.813" | 0.375" |

TABLE 4

Standard values for each portion of unthreaded sleeve of IJC

| Nominal OD of OCTG body | OD of box W | ID of unthreaded sleeve Q | Wall thickness of unthreaded sleeve t2 |
|---|---|---|---|
| 1.315" | 1.550" | 1.378" | 0.086" |
| 1.660" | 1.880" | 1.723" | 0.079" |
| 1.900" | 2.110" | 1.963" | 0.074" |
| 2.063" | 2.325" | 2.156" | 0.085" |

As shown in FIG. 1, in the end portion of the box 10 which is the portion having an axial length 17 from the end surface 15 of the box to a position 16 at least 2 threads (4 threads in the example shown in FIG. 1) from the end of the female threads closest to the end surface 15, the box 10 preferably has a portion 19 (a swoosh portion) where the outer peripheral surface is excised by a thickness of at least ⅓ and at most ½ of the wall thickness of the unthreaded sleeve 11 prescribed in API standards. Namely, in the swoosh portion 19, the box outer radius r1 is smaller than the outer radius r2 prior to formation of the swoosh portion (the radius of the "normal portion" 18 which is the portion of the box other than the swoosh portion 19) by at least ⅓ and at most ½ of the wall thickness t2 of the unthreaded sleeve 11 before formation of the swoosh portion 19 (which is the wall thickness in API standards).

When the unthreaded sleeve partially remains, the value of the wall thickness t1 of the unthreaded portion 11 in the swoosh portion 19 and the value of t2 satisfy the following inequality:

$$(1/2)t2 \leq t1 \leq (2/3)t2.$$

In other words, in the swoosh portion 19, the wall thickness t1 of the unthreaded sleeve 11 is at least ½ and at most ⅔ of the wall thickness t2 of the unthreaded sleeve 11 before formation of the swoosh portion 19. If the wall thickness t1 of the swoosh portion 19 is too large, the effect of decreasing the contact force between the threads decreases. On the other hand, if the wall thickness t1 is too small, the end surface 15 of the box 10 easily deforms in the field and ease of handling in the field becomes poor.

The axial length 17 of the swoosh portion 19 needs to be sufficiently long that the swoosh portion 19 extends to the outer surface of the threads where it is desired to decrease the contact pressure. A high contact pressure develops for around two threads from the extreme end of the female threads 12, so the length 17 in the axial direction of the swoosh portion 19 is such that the swoosh portion 19 extends by at least two threads past the end of the female threads 12 closest to the end surface of the box 10. However, if the swoosh portion 19 is excessively long, the strength of the box 10 decreases, and at the time of makeup operations, problems develop such as it becoming difficult to carry out chucking of the box 10. Accordingly, the upper limit on the length 17 in the axial direction is preferably such that the swoosh portion 19 extends by at most approximately 10 threads past the end of the female threads 12 closest to the end surface of the box.

The shape of the outer surface of the swoosh portion 19 may be selected, based on ease of working, from any of a cylindrical surface, a tapered surface, or a surface of revolution formed by rotating a simple geometric curve such as an arc of a circle, a parabola, a hyperbola, or the like. It is also possible for the outer surface to be a combination of two or more of these types (such as a combination of a cylindrical surface and a tapered surface, a cylindrical surface and a surface of revolution, or a tapered surface and a surface of revolution).

The shape of the connecting portion 20 between the swoosh portion 19 and the normal portion 18 may be a tapered surface 20a as shown in the drawings, or it can also be a surface of revolution formed by rotating a simple geometric curve such as an arc of a circle having a large curvature.

As stated above and as shown by the dashed line in FIG. 1, the standard value of the bevel angle θ, which is the angle of the sloping surface (the bevel) connecting the thread closest to the end surface 15 of the box 10 in the axial direction and the unthreaded sleeve 11 (or the end surface of the box 10 when there is no unthreaded sleeve) with respect to a plane perpendicular to the axis of the box 10 is 65 degrees for all API round threaded joints.

In a preferred mode of the present invention, this bevel angle θ is within ∀15 degrees of the flank angle of the triangular threads (the angle with respect to a plane perpendicular to the box axis). The triangular threads of an API round threaded joint typically have a flank angle of 30 degrees. In this case, the bevel angle θ is most preferably in the range of 30∀5 degrees. However, as shown by the below-described examples, there is no substantial change in the effect of decreasing the contact pressure applied to the threads if the bevel angle considerably deviates from 30 degrees. Therefore, the bevel angle can be 30∀15 degrees (namely, it can be 15-45 degrees).

FIGS. 2(a)-(h) are cross-sectional views showing portions of the ends of variations 10-1 to 10-8 of a box of a threaded joint for pipes according to the present invention. The dashed lines in the figures show the shape of a box prescribed by API standards.

As stated above, in a threaded joint for steel pipes according to the present invention, in order to decrease the contact pressure on the threads of a pin and a box at the ends of the box which are the main cause of galling, it is effective to modify the shape of an API round threaded joint by (1) removing or shortening the unthreaded sleeve, (2) providing a swoosh portion 19, or (3) optimizing the bevel angle θ. Of these modifications, (1) removing or shortening the unthreaded sleeve 11 has the greatest effect so it is an essential modification, while the remaining modifications (2) and (3) can be employed independently as necessary. A greater effect of decreasing contact pressure can be obtained by employing one or both of modifications (2) and (3) in addition to (1).

Figure 2A:
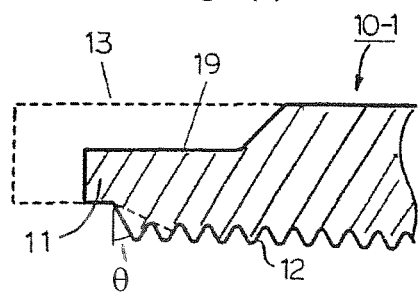
FIG. 2 shows cross-sectional views of portions of the ends of various embodiments of a box of a threaded joint for steel pipes according to the present invention.
Figure 2B:
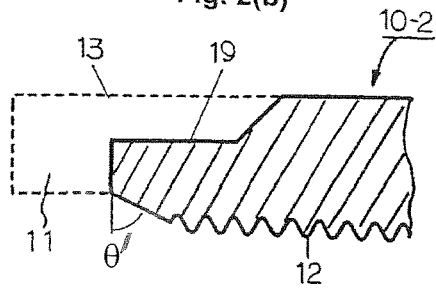
Figure 2C:
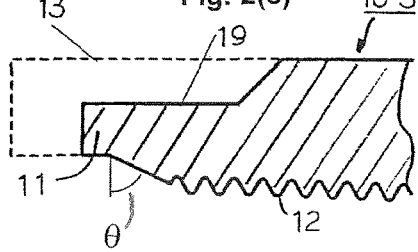
Figure 2D:
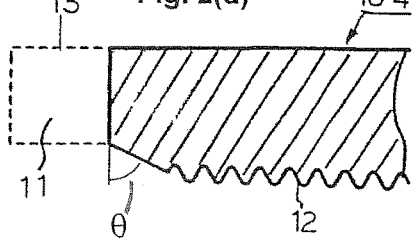
Figure 2E:
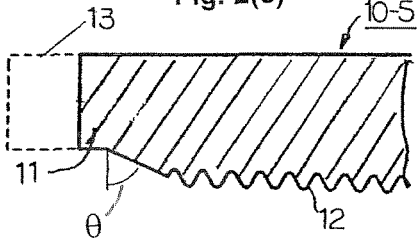
Figure 2F:
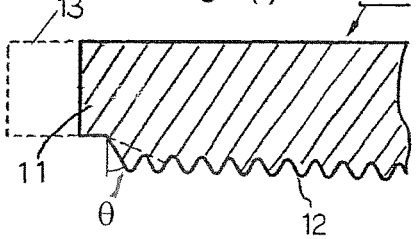
Figure 2G:
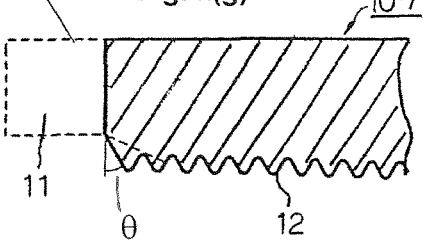
Figure 2H:
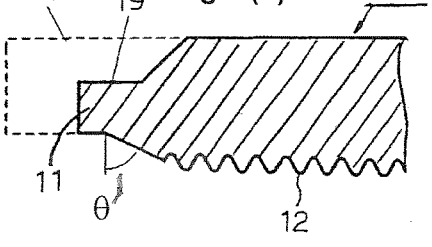

Explaining FIG. 2 in detail, FIG. 2(a) shows an example in which shortening of the unthreaded sleeve, provision of a swoosh portion, and variation of the bevel angle θ were carried out. FIG. 2(b) shows an example in which the unthreaded sleeve was removed and a swoosh portion was provided. FIG. 2(c) shows an example in which the unthreaded sleeve was shortened and a swoosh portion was provided. FIG. 2(d) shows an example in which only removal of the unthreaded sleeve was carried out. FIG. 2(e) shows an example in which only shortening of the unthreaded sleeve was carried out. FIG. 2(f) shows an example in which shortening of the unthreaded sleeve and modification of the bevel angle θ were carried out. FIG. 2(g) shows an example in which removal of the unthreaded sleeve and modification of the bevel angle θ were carried out. FIG. 2(h) shows an example in which shortening of the unthreaded sleeve and provision of a swoosh portion were carried out.

A threaded joint for steel pipes according to the present invention can stably exhibit excellent galling resistance with a usual lubricant and surface treatment even in the field at an oil well where quality control and process control are inadequate and the joint undergoes rough handling.

EXAMPLES

The following examples illustrate the present invention, but they are not intended to limit the invention.

In order to demonstrate the effects of the present invention, the local contact pressure acting on the threads at the end of a box of a threaded joint for steel pipes was evaluated by numerical simulation using the finite element method.

The test sample was a coupling-type API round threaded joint for a 9⅝ inch 47# N80 API oil country tubular good. The state in which this threaded joint was made up to the vanish point and the state in which the joint was tightened by two turns beyond the vanish point were simulated.

Representative dimensions of the pipe body on which the pin was formed and the coupling body in which the box was fanned were as follows.

Figure 3:
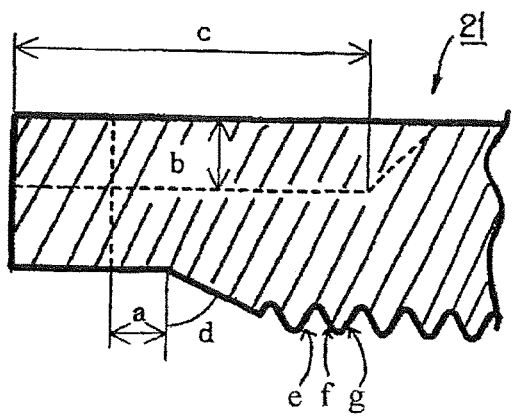
FIG. 3 is a cross-sectional view of a portion of the end of a box which is analyzed in an example.

[Pipe Body]
Nominal outer diameter: 244.48 mm
Nominal wall thickness: 11.99 mm
Nominal yield strength: 80 ksi (552 MPa)
[Coupling Body]
Coupling outer diameter: 270.56 mm
Length of coupling: 266.7 mm
Length of unthreaded sleeve: 11 mm
Wall thickness of unthreaded sleeve: 10 7 mm
Thread pitch: 3.175 mm (8 threads per inch)
Bevel angle of end thread of female threads: 65 degrees
Numerical simulation by the finite element method was performed on the above-described standard API round threaded joint as well as on round threaded joints having shapes combining, in the manner shown in Table 5, the shape factors a-d of the end of the box (coupling) 21 shown in FIG. 3 (a: length of unthreaded sleeve, b: depth of swoosh portion, c: length 17 of swoosh portion, d: bevel angle θ), and the local contact pressure on the two threads at the end of the box was evaluated.

As shown in FIG. 1, a in FIG. 3 corresponds to L1 in FIG. 1, b in FIG. 3 corresponds to (t2−t1) in FIG. 1, c in FIG. 3 corresponds to [17+(L2−L1)] in FIG. 1, and d in FIG. 3 corresponds to θ in FIG. 1. The outer surface of the swoosh portion was cylindrical, and the connecting surface between the swoosh portion and the normal portion of the box (the unswoosh portion) was a tapered surface having a taper angle of 45 degrees.

In Table 5, the reason why the number of threads by which the swoosh portion extends past the end of the female threads varies even when the length c of the swoosh portion is the same value of 25 mm is because the bevel angle d varies, and the smaller the bevel angle d, the smaller is the length of the beveled portion in the axial direction of the box.

Table 6 shows the results of numerical simulation. In Table 6, the first thread means the complete thread closest to the end of the box (coupling), and the second thread means the complete thread next to the first thread. The load flank is the thread flank where the threads of the pin and the box contact when the joint receives a tensile load. On the other hand, the stabbing flank is the thread flank where the threads of a pin and the box contact during stabbing of the pin or when the joint is subjected to a compressive load. In FIG. 3, the load flank of the first thread is indicated by e, the stabbing flank of the second thread is indicated by f, and the load flank of the second thread is indicated by g.

TABLE 5

| No. | Sleeve length a [mm] | Swoosh depth b [mm] | Swoosh length c [mm] | Bevel angle of end of female threads d [degrees] | Comments |
|---|---|---|---|---|---|
| 1 | 0 | 5 | 25*1 | 30 | |
| 2 | 3 | 5 | 25*1 | 30 | |
| 3 | 3 | 5 | 25*2 | 45 | |
| 4 | 0 | 0 | 0 | 45 | |
| 5 | 0 | 0 | 0 | 30 | |
| 6 | 3 | 0 | 0 | 45 | |
| 7 | 3 | 0 | 0 | 30 | |
| 8 | 0 | 5 | 25*3 | 65 | |
| 9 | 3 | 5 | 25*3 | 65 | |
| 10 | 0 | 0 | 0 | 65 | |
| 11 | 11 | 5 | 25*3 | 65 | Outside present invention |
| 12 | 8 | 0 | 0 | 65 | Outside present invention |
| 13 | 11 | 0 | 0 | 65 | API round threaded joint |

*1Corresponds to length of approximately 4 threads from end of engagement of female threads
*2Corresponds to length of approximately 3 threads from end of engagement of female threads
*3Corresponds to length of approximately 2 threads from end of engagement of female threads

TABLE 6

| | Prescribed makeup position | | | Prescribed makeup position + 2 turns | | |
|---|---|---|---|---|---|---|
| No. | Load flank of 1st thread from end [MPa] | Stab flank of 2nd thread from end [MPa] | Load flank of 2nd thread from end [MPa] | Load flank of 1st thread from end [MPa] | Stab flank of 2nd thread from end [MPa] | Load flank of 2nd thread from end [MPa] |
| 1 | 269 | 183 | 221 | 427 | 64 | 286 |
| 2 | 362 | 256 | 267 | 502 | 117 | 340 |
| 3 | 321 | 303 | 306 | 318 | 106 | 419 |
| 4 | 392 | 449 | 392 | 410 | 350 | 563 |
| 5 | 461 | 333 | 316 | 564 | 270 | 455 |
| 6 | 465 | 565 | 471 | 530 | 492 | 726 |
| 7 | 569 | 397 | 357 | 657 | 361 | 518 |
| 8 | 506 | 556 | 294 | 667 | 521 | 397 |
| 9 | 610 | 658 | 358 | 801 | 639 | 522 |
| 10 | 638 | 768 | 410 | 869 | 791 | 644 |
| 11 | 807 | 857 | 546 | 1014 | 881 | 883 |
| 12 | 800 | 959 | 623 | 1031 | 978 | 1035 |
| 13 | 905 | 1024 | 672 | 1069 | 999 | 1123 |

As shown in Table 6, a threaded joint according to the present invention had a lower local contact pressure than a standard API round thread or other s comparative examples. In addition, the effect of decreasing the thread contact pressure was increased by not only shortening or eliminating the unthreaded sleeves at the ends of the box but by providing a swoosh portion and/or varying the bevel angle. The greatest effect was obtained by both providing a swoosh portion and varying the bevel angle.

The invention claimed is:

1. A threaded joint for steel pipes which is constituted by a pin and a box which interfit, the pin having male threads with a triangular thread shape, and the box having female threads with a triangular shape which mesh with the male threads, an unthreaded sleeve at each end of the box, wherein the box has a wall thickness and the wall thickness is smallest at a female thread section closest to an end of the box, and the box has a swoosh portion which starts from an end surface of the box and extends in a direction opposite an end surface of the box along an axis of the box for at least two threads from the female thread closest to the end surface of the box, the swoosh portion having an outer surface with a radius which is smaller than a radius of the outer surface of the box other than the swoosh portion by at least ⅓ and at most ½ of a difference between the radius of the outer surface of the box other than the swoosh portion and an inner radius of an inner surface at the end surface of the box.

2. A threaded joint for steel pipes as set forth in claim 1 wherein the swoosh portion is constituted by one or more of a cylindrical surface, a tapered surface, or a surface of rotation formed by rotating a curve.

3. A threaded joint for steel pipes as set forth in claim 1 wherein the swoosh portion extends in the axial direction of the box rearwards from the female thread closest to the end surface of the box by not more than 10 threads.

4. A threaded joint for steel pipes as set forth in claim 1 wherein a bevel angle of a sloping surface, which connects the unthreaded sleeve or the end surface of the box to an endmost thread disposed closest to the end surface of the box is at most +15 degrees of the flank angle of the triangular threads constituting the female threads.

5. A threaded joint for steel pipes as set forth in claim 1 wherein a bevel angle of an end thread is 30 ±15 degrees.

* * * * *